Dec. 23, 1969   R. L. COLETTI   3,485,269
FLUID DRIVEN FLOW DIVIDING VALVE
Filed Jan. 18, 1968   3 Sheets-Sheet 1
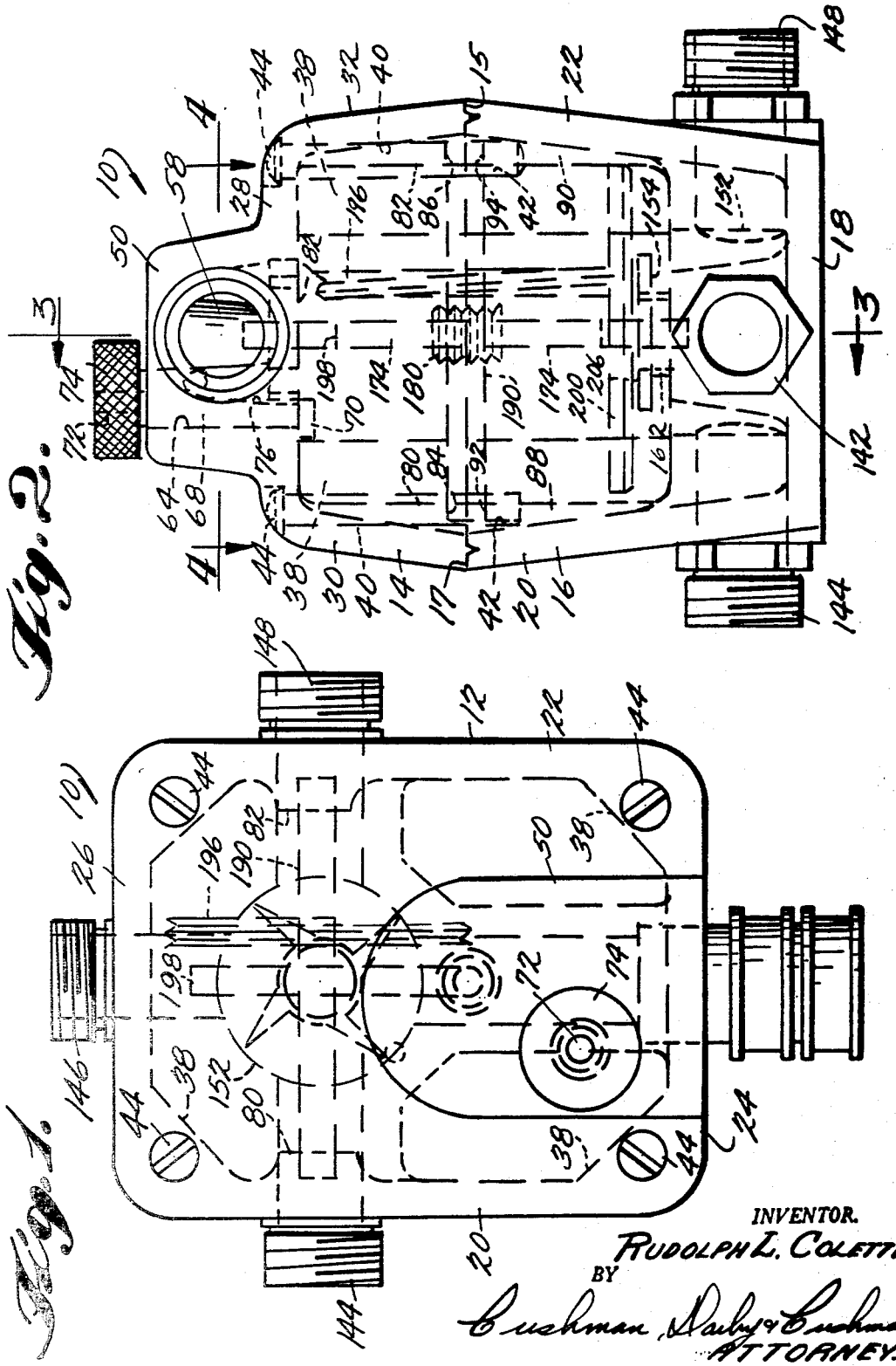
INVENTOR.
RUDOLPH L. COLETTI
BY
Cushman, Darby & Cushman
ATTORNEYS

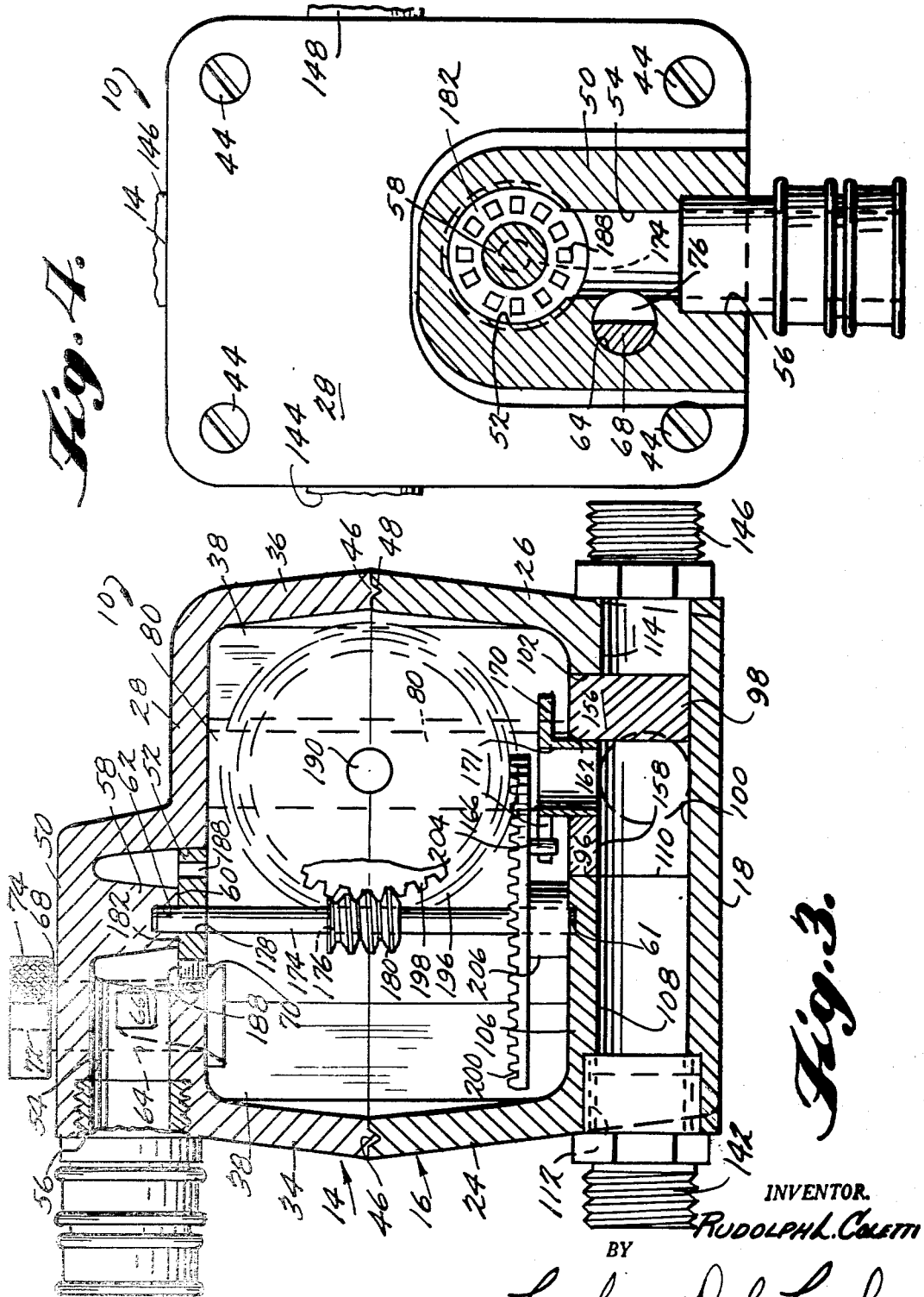

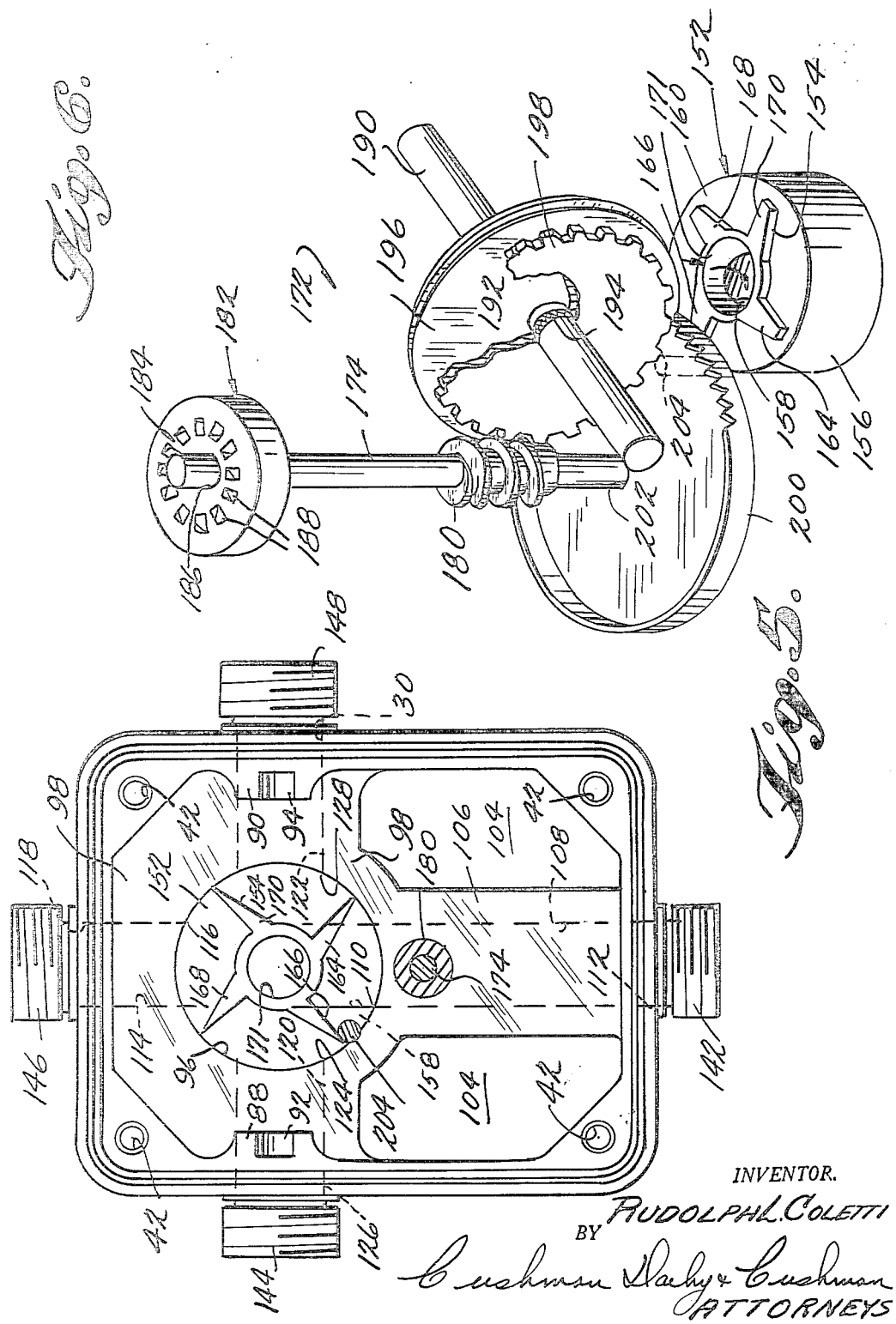

United States Patent Office

3,485,269
Patented Dec. 23, 1969

3,485,269
FLUID DRIVEN FLOW DIVIDING VALVE
Rudolph L. Coletti, 246 5th Ave., Troy, N.Y. 12182
Filed Jan. 18, 1968, Ser. No. 698,918
Int. Cl. F17d *3/00;* F16k *31/36;* A01g *25/00*
U.S. Cl. 137—624.14                    3 Claims

ABSTRACT OF THE DISCLOSURE

A drive train is encased in a two-part enclosure having an inlet and several angularly spaced outlets. Fluid, typically water, entering the inlet is divided, part passing directly to a flow dividing valve, the adjustable-amount remainder first passing through a turbine powering the drive train for indexing the valve to serially supply each of the outlets, typically for intermittently supplying water to each of several lawn sprinklers.

BACKGROUND AND SUMMARY OF THE INVENTION

U.S. Patent 3,181,551 discloses a flow dividing valve wherein each of the several outlets is normally biased closed by a cam, rotated by a water turbine drive train. As the cam rotates, the valves are intermittently, serially allowed to open. The construction of the patent necessitates a relatively large number of parts, and while it operates as planned, is not as susceptible of large scale manufacture for sale at moderate price as could be hoped for.

The device of the present invention is simpler and more susceptible of large scale manufacture; has fewer parts, such as springs, which are susceptible to failure, and thus can be expected to give longer carefree service.

Although the flow dividing device of the invention is particularly useful for supplying water to several lawn sprinkler heads intermittently, serially, it should be recognized that the device has general utility for proportionating fluid streams among several conduits or receptacles.

The principles of the invention will be further hereinafter discussed with reference to the drawings wherein preferred embodiments are shown. The specifics illustrated in the drawings are intended to exemplify, rather than limit the aspects of the invention as defined in the claims.

BRIEF DESCRIPTION OF THE DRAWINGS

In the drawings:
FIGURE 1 is a top plan view of a flow dividing valve or sprinkler changer illustrating the principles of the invention;
FIGURE 2 is a rear elevation view of the sprinkler changer;
FIGURE 3 is a vertical sectional view taken substantially along line 3—3 of FIGURE 2;
FIGURE 4 is a fragmentary horizontal sectional view taken substantially along line 4—4 of FIGURE 2;
FIGURE 5 is a top plan view of the sprinkler changer housing lower portion, valve and hose connection adaptors; and
FIGURE 6 is a perspective view of the changer valve water-driven drive train.

The flow dividing valve 10 includes a case or housing 12 having an upper, downwardly opening cup shaped portion 14 and a lower, upwardly opening cup shaped portion 16. The portions 14, 16 are preferably molded of conventional plastic, for instance, polymerized ABS resin.

The lower portion 16 is generally rectangular in horizontal section and enlarges in cross-sectional area toward the upper flat edge 17 thereof, i.e. the lower portion 16 generally resembles an inverted truncated pyramidal prism having a flat, rectangular bottom wall 18, trapezoidal left and right sidewalls 20, 22 and trapezoidal front and rear end walls 24, 26, all integrally joined.

Similarly, the upper portion 14 is generally rectangular in horizontal section and enlarges in cross-sectional area toward the lower flat edge 15 thereof, i.e. the upper portion 14 generally resembles a truncated pyramidal prism having a generally flat, rectangular top wall 28, trapezoidal left and right sidewalls 30, 32 and trapezoidal front and rear end walls 34, 36, all integrally joined.

Sections 38 of increased thickness at the sidewall corners of the portions 14 and 16 are formed with aligned, threaded openings and sockets respectively 40, 42 for receiving screws 44 for securing the housing portions 14, 16 together with the edges 15, 17 in sealed relationship. A circumferential groove 46 formed centrally in the edge 17 receives a resilient sealing ring 48 to assist in sealing between the housing portions. In instances where the housing is itself composed of stiffly resilient material, the ring 48 may be provided by forming an integral bead on the edge 15 for sealing entry into the groove 46. In the example, the screws 44 are, for instance, 1/4-20 x 2 inch round head brass screws.

A protuberance is integrally formed on the top wall 28 at 50 extending, midway between the sides of the portion 14, from the rear end thereof about half way garden hose fitting. Immediately above the opening 52 formed through the top wall 28 communicates the interior of the housing with the inner end of a horizontal passageway 54 in the protuberance 50. The passageway 54 opens outwardly of the rear of the protuberance at 56 where it is internally threaded to receive a hose-fitting adaptor, for instance a McMaster Carr 7467T (1NPT X 1HT) fitting with standard adaptor to receive a male garden hose fitting. Immediately above the opening 52 a downwardly projecting, downwardly tapering integral leg 58 of circular transverse cross section is provided, having a disk-shaped bottom surface 60 located centrally of the upper extent of the mouth of the opening 52. The diameter of the surface 60 is, typically, about 50 percent as large as the diameter of the opening 52.

A downwardly opening cylindrical socket 62 is centrally formed in the disk-shaped surface 60.

Intermediate the leg 58 and the mouth 56 of the passageway 54 a vertical, cylindrical opening 64 is formed through the protuberance 50, left of the passageway 54, but of sufficiently great diameter to intersect the passageway 54.

The opening 64 slidingly receives from the bottom a generally cylindrical valve key or rotor 66. The valve 66 is preferably molded of plastic, similar to that of the housing 12 and includes a central cylindrical portion 68 of approximately the same length as the opening 64, an integral enlarged stop collar 70 at its lower end, and an integral axially directed peg 72 of reduced diameter extending from its upper end.

After the valve 66 is in place an enlarged annular knurled knob 74 is secured on the peg 72, for instance by force fit, heat welding, solvent welding, or the like.

It should now be noticed that the lower half of the central portion 68 and collar 70 are longitudinally cut away to form an alternate opening 76 between the water inlet passageway 54 and the interior 78 of the housing 12. It should also be eivdent that rotation of the valve 66 by manually turning the knurled knob 74 increases and decreases the visibility of the alternate opening 76 to the passageway 54 for regulation of the relative amounts of water entering the housing interior through the opening 52 and alternate opening 76.

The housing upper portion 14 is completed by two vertically extending bosses 80, 82 opposite one another on the left and right sidewall interior surfaces forward of the protuberance 50. The bosses facing surfaces are generally vertical so that the bosses 80, 82 increase in thickness as they proceed toward the lower edge of the housing upper portion. Immediately adjacent that lower edge, downwardly opening semi-cylindrical sockets 84, 86 are formed in the bosses 80, 82. The sockets 84, 86 are in axial alignment horizontally, transversely of the housing.

With attention to FIGURE 5, the housing lower portion 16 includes similar bosses 88, 90 on its sidewalls, ending in semi-cylindrical sockets 92, 94 respectively complementing the sockets 84, 86 to form bearings 84, 92 and 86, 94 for purposes described hereinafter.

The floor of the housing portion 16 near the front thereof is relatively thick, for instance taking up about one third of the height of the portion 16. A cylindrical, upwardly opening well 96 is provided in this thick portion 98 of the floor, defined by a flat bottom 100 and a cylindrical, vertical, peripheral wall 102. The floor is less thick at the regions 104 in order to save material and maximize the interior volume of the housing. Between the regions 104 a tunnel hump 106 is integrally formed on the floor extending longitudinally between the housing lower portion rear wall and the cylindrical well 96. The tunnel 106 has a longitudinal bore 108 connecting at port 110 with the well 96 and at 112 with the exterior of the housing lower portion. On the opposite side of the well 96 a horizontal bore 114 formed longitudinally in the floor connects with the well at a port 116 and with the exterior of the housing lower portion at 118. Angularly intermediate the bores 108 and 114 similar horizontal bores 120, 122 are formed transversely within the floor in line with the bosses 88, 90. The bore 120 connects with the well 96 at a port 124 and with the left side of the exterior of the housing lower portion at 126; the bore 122 connects with the well 96 at a port 128 and with the right side of the exterior of the housing lower porion at 130. The outer ends 112, 126, 118, 130 of the bores 108, 120, 114 and 122 are internally threaded to receive hose fitting adaptors 142, 144, 146, 148, for instance McMaster Carr 7467 T (1 NPT X 1 HT) fittings for receiving standard female hose fittings. Bosses 150 integrally formed on the exterior of the housing lower portion peripherally of each bore end 112, 126, 118, 130 have vertical outer faces to facilitate mounting of the hose fitting adaptors 142, 144, 146, 148.

The structure depicted in FIGURE 5 is completed by a distributor valve 152 rotatably received in the well 96 and having a changer in the form of a four-armed modified star wheel 154 extending axially upwardly therefrom. The valve 152 includes a tubular sidewall 156, preferably having a single opening 158 horizontally therethrough. The sidewall 156 is topped by an integral annular radially directed wall 160 which merges into a short axially upwardly extending portion 162 on which is secured the changer 154 having arms 164, 166, 168, 170. The changer 154 has a central vertical opening 171 therethrough which continues through the portion 162 into the interior of the valve 152, thus connecting with the valve opening 158. The valve 152 and changer 154 may be integrally formed of, for instance synthetic plastic material, or formed as separate parts fastened to one another by conventional means.

It should now be noticed that an upwardly opening, cylindrical socket 61 is formed in the tunnel hump 106 directly beneath the socket 62 in the leg 58 for purposes to be described hereinafter.

With particular reference to FIGURE 6, the drive train 172 comprises a first, vertical shaft 174, for instance 0.25 inch in diameter and 3.75 inches long. The shaft is knurled at 176 near its center and at 178 near its upper end to respectively receive and securely mount a worm 180, for instance ½ inch—8 threads/inch, 0.419 inch pitch diameter, 9/16 inch long, made of brass and a molded plastic turbine wheel 182, for instance 1.25 inches in diameter with an annulus 184 of 60 degree pitch vanes intermediate the central hole 186 and outer extent of the turbine wheel 182.

Slots 188 pass through the turbine wheel between adjacent vanes in the annulus 184.

The drive train further includes a second, horizontal shaft 190, for instance 0.3125 inch in diameter and 3.25 inches long. The shaft 190 is knurled at 192 and 194 in two adjacent bands near the center thereof to respectively receive and securely mount a worm 196, for instance 29/16 inch—8 threads/inch, 9/16 inch long and a worm wheel 198, for instance 2.190 inch pitch diameter, 2.271 outside diameter—8 teeth/inch with 60 degree included angle. The worm wheel 198 is 3/16 inch thick, has 55 teeth, pitched at an angle of 7 degrees.

The worm 180 is in driving engagement with the worm wheel 198. The worm 196 is in driving engagement with a worm wheel 200, for instance, stamped from sheet material, such as brass, 1/16 inch thick, so as to have 8 upwardly directed teeth per inch. The worm wheel 200 has an overall thickness of 3/16 inch and has a central opening 202 by which it is freely rotatably received on the shaft 174 near the lower end thereof. Near the worm wheel 200 outer periphery, a vertical drive pin 204 is secured to the bottom of the worm wheel. The pin 204 is, for instance, a brass pin ⅛ inch in diameter and ¼ inch long. An annular spacer 206 of ⅝ inch O.D., ⅜ inch long is slidingly received on the lower end of the shaft 174 for supporting the worm wheel 200.

The drive train is simply mounted in the housing by rotatably supporting the ends of the shaft 174 in the sockets 61, 62 and by rotatably supporting the ends of the shaft 190 in the socket bearings 84, 92 and 86, 94.

Such mounting places the turbine wheel 182 in the opening 52, supports the spacer 206 on the tunnel hump 106 and places the drive pin 204 in position to engage between arms of the star wheel 154. Thus as water enters the inlet at 56, part passes through and drives the turbine wheel, driving the gear train. The remainder of the incoming water bypasses through the valve 66 and rejoins within the valve housing the water which passed through the turbine wheel.

As the drive train operates, the worm wheel 200 is rotated and during each rotation the pin 204 catches a next star wheel 154 arm, advancing the valve 152 angularly 90 degrees before being rotated free of that star wheel arm. Thus during each rotation of the wheel 200, there is one indexing of the valve 152 to shunt the water supply entering the valve 152 to a next outlet.

The reduction provided by the drive train is such that for each revolution of the water wheel 182, the worm wheel 200 rotates a fraction of a revolution. For certain applications, i.e. where rapid, short duration pulses of fluid to the individual outlets 142, 144, 146, 148 are desired, the drive pin 204 can be mounted on the shaft 174 so as to project laterally therefrom into the path of rotation of the star wheel. The worm wheel 200, worm 196, worm wheel 198 and worm 180 and shaft 190 may be omitted. As an intermediate solution the worm wheel 200 could be retained and fixed on the shaft 174, variation of the radial location of the pin 204 on the wheel 200 and the shape and number of the arms on the star wheel being used to provide the desired speed of rotation of the distributing valve 152. All three variants may be used as more and less expensive models in order to provide a full product line for various end uses.

Although the entire valve 10 is preferably made of brass and molded plastic material, other materials known in the art could be used.

It should now be apparent that the fluid driven flow dividing valve as described hereinabove possesses each of the attributes set forth in the specification under the heading "Background and Summary of the Invention" hereinbefore.

What is claimed is:

1. A fluid powered flow dividing valve comprising a housing having opposed cup-shaped portions; means removably securing the two housing portions to one another; means defining a first socket on one of said housing portions, opening interiorly of the housing; means defining a second socket on the other of said housing portions, opening toward and being aligned with the first socket; a shaft received within said housing and having opposite ends thereof journalled in said first and second sockets; a turbine wheel fixedly mounted on said shaft; a fluid inlet into said housing, said inlet being constructed and arranged to impinge incoming fluid on said turbine wheel for rotating said turbine wheel and shaft; the second of said housing portions having a floor; means defining a generally cylindrical, upwardly opening well in said floor; means defining a plurality of angularly spaced fluid outlets from said housing peripherally of said well; separate conduit means connecting each outlet with said well; a valve rotor received in said well for rotation about the vertical axis thereof; said valve rotor having an axial inlet port, at least one radial outlet port and conduit means connecting said inlet and outlet ports, said inlet port being communicated to incoming fluid within the housing; and cooperating means operatively connected to said shaft and mounted on said valve rotor for indexing said valve rotor angularly by a predetermined amount for each rotation of said turbine wheel for distributing incoming fluid among said outlets; the cooperating means on the valve rotor comprises a star wheel coaxially mounted on the valve rotor; and the cooperating means operatively connected to the shaft comprises a drive pin mounted for rotation about the shaft intermittently into and out of the locus of the star wheel for intermittently indexing the star wheel; the cooperating means operatively connected to the shaft further includes a rotation speed reducing train connected between said shaft and said pin whereby said pin rotates less than once about said shaft for each rotation of said turbine wheel; and further including two, axially aligned, opposed sockets each cooperatively defined between said cup-shaped housing portions at the juncture thereof; and wherein the rotation speed reducing train comprises: a second shaft having opposite ends thereof journalled in said cooperatively defined, opposed sockets; a first worm fixed on the first-mentioned shaft intermediate the ends thereof; a first worm wheel fixed on the second shaft in meshing relationship with said first worm; a second worm fixed on the second shaft; a second worm wheel rotatably received on said first-mentioned shaft in meshing relationship with said second worm; said drive pin being secured to said second worm wheel at a point radially removed from the rotation axis therof.

2. The valve of claim 1 wherein the two housing poritons are each integrally molded of synthetic plastic material; said fluid inlet and said fluid outlets each comprising internally threaded openings; a hose fitting adapter being threadably received in each threaded opening.

3. The valve of claim 1 further including a cylindrical opening formed through the housing upstream of the turbine wheel, communicating with the interior of the housing and intersecting said fluid inlet; a valve rotor rotatably mounted in said cylindrical opening, having an inlet selectively communicatable to said fluid inlet and an outlet communicated to said housing interior for selectively bypassing an adjustable amount of incoming fluid into the housing interior.

References Cited

UNITED STATES PATENTS

| 2,642,076 | 6/1953  | Tigert et al. | 137—119 |
| 2,742,918 | 4/1956  | Irving        | 137—119 |
| 3,108,609 | 10/1963 | Schroder      | 137—119 |
| 3,181,551 | 5/1965  | Coletti       | 137—119 |

FOREIGN PATENTS 616,177  3/1961  Canada.

ROBERT G. NILSON, Primary Examiner

U.S. Cl. X.R.

251—59